US012643672B2

(12) United States Patent
Phillips et al.

(10) Patent No.: US 12,643,672 B2
(45) Date of Patent: Jun. 2, 2026

(54) AIRCRAFT ASSEMBLY

(71) Applicant: AIRBUS OPERATIONS LIMITED, Bristol (GB)

(72) Inventors: Samuel Phillips, Bristol (GB); Anthony Bryant, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/874,869

(22) PCT Filed: Jun. 14, 2023

(86) PCT No.: PCT/GB2023/051547
§ 371 (c)(1),
(2) Date: Dec. 13, 2024

(87) PCT Pub. No.: WO2023/242564
PCT Pub. Date: Dec. 21, 2023

(65) Prior Publication Data
US 2025/0361020 A1 Nov. 27, 2025

(30) Foreign Application Priority Data

Jun. 14, 2022 (GB) ..................................... 2208677
Jun. 14, 2022 (GB) ..................................... 2208699
Sep. 27, 2022 (GB) ..................................... 2214062

(51) Int. Cl.
*B64D 37/30* (2006.01)
*B64C 3/18* (2006.01)
(Continued)

(52) U.S. Cl.
CPC .............. *B64D 37/30* (2013.01); *B64C 3/187* (2013.01); *B64D 37/005* (2013.01); *F16L 9/22* (2013.01); *F16L 39/04* (2013.01)

(58) Field of Classification Search
CPC ............. B64C 3/187; B64D 37/30; F16L 9/22
See application file for complete search history.

(56) References Cited

U.S. PATENT DOCUMENTS 757,112 A * 4/1904 Holmes ................... F16L 27/06
285/271
1,057,939 A * 4/1913 Cooper ................... F16L 27/04
285/379
(Continued)

FOREIGN PATENT DOCUMENTS

DE 102007014949 A1 * 9/2008 .......... F16L 27/0857
FR 3027371 A1 4/2016
(Continued)

OTHER PUBLICATIONS

De 10 2007 014 949 A1 (English Translation) (Year: 2008).*
(Continued)

*Primary Examiner* — Joshua J Michener
*Assistant Examiner* — Michael B. Kreiner
(74) *Attorney, Agent, or Firm* — Nixon & Vanderhye P.C.

(57) ABSTRACT

An aircraft assembly is disclosed including a rib of a wing, an aperture in the rib, and a pipe assembly extending through the aperture. The pipe assembly includes a first rigid pipe section, a second rigid pipe section and a flexible pipe section between the first and second rigid pipe sections; and a fixture arrangement that couples one of the pipe sections to the wing rib. The flexible pipe section is located at a plane of the rib and configured to allow relative movement between the first rigid pipe section and the second rigid pipe section.

19 Claims, 11 Drawing Sheets

(51) Int. Cl.
    *B64D 37/00*           (2006.01)
    *F16L 9/22*            (2006.01)
    *F16L 39/04*          (2006.01)

(56)             References Cited

U.S. PATENT DOCUMENTS

| | | | |
|---|---|---|---|
| 2,451,252 A | 10/1948 | Stoeckly | |
| 2,470,989 A | 5/1949 | Sidney et al. | |
| 2,904,356 A * | 9/1959 | Love | F16L 27/0857 |
| | | | 285/226 |
| 3,112,129 A * | 11/1963 | Willis | F16L 27/0857 |
| | | | 285/226 |
| 4,139,221 A * | 2/1979 | Shotbolt | F16L 37/52 |
| | | | 285/271 |
| 4,165,107 A | 8/1979 | Affa et al. | |
| 4,643,463 A * | 2/1987 | Halling | F16L 27/0857 |
| | | | 285/226 |
| 4,652,025 A * | 3/1987 | Conroy, Sr. | F16L 27/0857 |
| | | | 285/226 |
| 4,893,847 A | 1/1990 | Hess | |
| 4,911,482 A | 3/1990 | Doat | |
| 5,067,690 A | 11/1991 | Bac | |
| 5,286,071 A | 2/1994 | Storage | |
| 5,611,577 A | 3/1997 | Meyer et al. | |
| 6,250,690 B1 * | 6/2001 | Sakai | F16L 27/04 |
| | | | 285/302 |
| 7,040,666 B2 * | 5/2006 | Christianson | F02K 1/805 |
| | | | 285/264 |
| 9,163,762 B2 * | 10/2015 | French | F16L 27/0857 |
| 9,630,722 B2 * | 4/2017 | Fraysse | F16L 27/113 |
| 10,125,907 B2 * | 11/2018 | French | F16L 25/12 |
| 10,293,952 B2 * | 5/2019 | James | B64D 37/005 |
| 11,112,040 B2 * | 9/2021 | Sparks | F16L 27/06 |
| 11,279,498 B2 * | 3/2022 | Petit | B64F 5/00 |
| 11,732,654 B2 * | 8/2023 | Verma | F02C 7/32 |
| | | | 415/182.1 |
| 12,429,096 B2 * | 9/2025 | Feaver | F16L 27/11 |
| 12,449,075 B2 * | 10/2025 | Bryant | B64D 37/005 |
| 2001/0052698 A1 | 12/2001 | Berengut et al. | |
| 2010/0295293 A1 * | 11/2010 | Healy | F16L 27/04 |
| | | | 285/95 |
| 2013/0026751 A1 | 1/2013 | Petit et al. | |
| 2013/0187013 A1 | 7/2013 | Minami | |
| 2014/0144002 A1 | 5/2014 | Conchi, Jr. et al. | |
| 2018/0156369 A1 | 6/2018 | Tajiri et al. | |
| 2021/0180733 A1 | 6/2021 | Gupta et al. | |
| 2024/0174373 A1 * | 5/2024 | Johnson | F16L 3/1091 |

FOREIGN PATENT DOCUMENTS

| | | | | |
|---|---|---|---|---|
| GB | 855384 A | 11/1960 | | |
| GB | 920428 A | 3/1963 | | |
| GB | 2572021 A * | 9/2019 | | B64D 37/005 |
| GB | 2598114 A | 2/2022 | | |

OTHER PUBLICATIONS

International Search Report for PCT/GB2023/051547, mailed Sep. 1, 2023, 5 pages.

Written Opinion of the ISA for PCT/GB2023/051547, mailed Sep. 1, 2023, 11 pages.

Search Report for GB2208677.1, dated Dec. 14, 2022, 4 pages.

\* cited by examiner

AIRCRAFT ASSEMBLY

CROSS REFERENCE TO RELATED APPLICATIONS

The present application is a National Phase of International Application Number PCT/GB2023/051547, filed Jun. 14, 2023, which designated the U.S. and claims priority benefits from United Kingdom Applications GB 2208699.5 filed Jun. 14, 2022; GB 2208677.1 filed Jun. 14, 2022; and GB 2214062.8 filed Sep. 27, 2022, the entire contents of each of which are hereby incorporated by reference.

FIELD OF THE INVENTION

The present invention relates to an aircraft assembly, an aircraft wing comprising the aircraft assembly, and an aircraft comprising the aircraft wing.

BACKGROUND OF THE INVENTION

There are a number of alternative fuels that are being considered to help meet future emissions targets, with one such approach being the use of hydrogen fuel. The cryogenic temperatures required for hydrogen fuels mean that the pipes are at a much lower temperature compared to the surrounding atmosphere, and this can result in significant contraction of the pipes.

Fuel pipes that extend along the aircraft wings are typically fastened to the ribs, thereby securing the pipes in position relative to the ribs. As a result, any contraction of the pipes causes loads that are transferred to the ribs. Similarly, aircraft wings bend and twist during service, such that the pipes bend and twist correspondingly. The pipes resist such movement and transfer the resulting loads into the ribs. These loads need to be accounted for when designing the ribs.

In addition, hydrogen fuel pipes typically have large thicknesses than conventional fuel pipes and this can further increase the loads transferred to the ribs.

SUMMARY OF THE INVENTION

A first aspect of the invention provides an aircraft assembly comprising: a rib of a wing; an aperture in the rib; a pipe assembly extending through the aperture, the pipe assembly comprising a first rigid pipe section, a second rigid pipe section and a flexible pipe section between the first and second rigid pipe sections; and a fixture arrangement that couples one of the pipe sections to the wing rib, wherein the flexible pipe section is located at a plane of the rib and configured to allow relative movement between the first rigid pipe section and the second rigid pipe section.

With this arrangement, relative movement between the rigid pipe sections either side of the wing rib is permitted whilst transferring substantially no load to the wing rib. Locating the flexible pipe section at the plane of the rib ensures maximum moveability of the rigid pipe sections either side.

The first rigid pipe section may be fixed relative to the rib and the second rigid pipe section moveable relative to the rib. This fixes at least a portion of the pipe assembly to the wing rib and prevents excessive axial movement of the pipe assembly.

The fixture arrangement may comprise a first joint section fixedly attached to the first rigid pipe section and a second joint section fixedly attached to the second rigid pipe section, wherein the first joint section is configured to contact the second joint section and maintain said contact during relative movement between the first rigid pipe section and the second rigid pipe section.

With this arrangement, a relatively fixed distance can be maintained between the second rigid pipe section and the rib, thereby avoiding clashing between the second rigid pipe section and the rib.

The first joint section and the second joint section may overlap at the plane of the rib. This ensures that the contact between the joint sections is at the plane of the rib, or at least proximate the plane of the rib, and thereby maximises the permittable movement of the second rigid pipe section without clashing.

The first joint section may comprise a planar profile and the second joint section may comprise a curved profile, wherein the first and second joint sections contact at a bearing surface between the planar profile and the curved profile.

With this arrangement, contact between the joint sections is minimal such that friction is reduced. The curved profile may also facilitate rotation of the second rigid pipe section relative to the rib about an axis perpendicular to the plane of the rib.

The pipe assembly may be an outer pipe assembly, and the aircraft assembly may comprise an inner pipe assembly enveloping the outer pipe assembly.

With this arrangement, a thermal barrier may be provided between the inner and outer pipe assemblies. This can be particularly beneficial for hydrogen fuels, and other fuels kept at cryogenic temperatures.

The inner pipe assembly may comprise a first rigid pipe section, a second rigid pipe section and a flexible pipe section between the first and second rigid pipe sections. The inner pipe assembly may therefore bend and twist with the outer pipe assembly.

The pipe assembly may be configured to convey hydrogen fuel. The cryogenic temperatures required for hydrogen fuels necessitate a thickening of the fuel pipes and/or contraction of the pipes that can increase the loads that may otherwise be transferred to the ribs.

The inner pipe assembly is configured to convey hydrogen fuel. This allows the space between the inner and outer pipe assemblies to act as a thermal barrier.

The hydrogen fuel may be liquid hydrogen fuel.

The hydrogen fuel may be gaseous hydrogen.

The inner pipe assembly may be spaced from the outer pipe assembly. This ensures no contact is made between the pipe assemblies, and thereby reduces heat transfer therebetween.

The space between the inner pipe assembly and the outer pipe assembly may comprise a vacuum or an inert gas.

The fixture arrangement may comprise a substantially electrically non-conductive material configured to isolate the rib from the pipe assembly. This ensures there is no metal-to-metal contact across the assembly, and thereby provides lightning strike protection. The material may be an electrically non-conductive polymer material. The polymer material may be lighter than an equivalent metal component but is typically less stiff. However, the reduced loads transferred to the rib make a polymer material suitable.

The pipe assembly may be continuous across the rib. Couplings and other arrangements not integrally formed are generally undesirable as they increase the risk of leakage. This is particularly the case for cryogenic pipes, which ideally avoid any seals between pipe sections.

The fixture arrangement may be configured to restrict movement of at least a portion of the pipe assembly in the longitudinal direction and allow rotation of the pipe assembly relative to the rib. This can supplement the relative movement provided by the flexible pipe section.

The fixture arrangement may be configured to allow rotation of the pipe assembly, relative to the rib, about a longitudinal axis extending in the longitudinal direction. With this arrangement, the fixture arrangement reduces or mitigates loads in the pipes caused by twist of the wing.

The fixture arrangement may be configured to allow rotation of the pipe assembly, relative to the rib, about two perpendicular axes, and preferably about three perpendicular axes. This allows the fixture arrangement to reduce or mitigate further loads caused by bending and/or twisting of the wing.

The fixture arrangement and the rib may have correspondingly curved surfaces forming a bearing surface therebetween so as to allow rotation of the pipe assembly relative to the rib.

The bearing surface may be formed by a protruding portion of the fixture arrangement and a recessed portion of the rib. This is one way of providing a curved bearing surface.

Optionally the flexible pipe section comprises a bellows pipe.

Optionally the fixture arrangement comprising a spherical bearing surface which allows rotation of the one of the pipe sections relative to the rib.

Optionally the fixture arrangement comprises a ball-and-socket joint.

Optionally the ball-and-socket joint comprises a ball in a socket, and the one of the pipe sections is coupled to the ball.

A second aspect of the invention provides an aircraft wing comprising the aircraft assembly of the first aspect.

The aircraft wing may comprise a plurality of aircraft assemblies according to the first aspect.

A third aspect of the invention provides an aircraft comprising the aircraft wing of the second aspect.

A fourth aspect of the invention provides an aircraft assembly comprising: an aircraft structure; a pipe assembly comprising a first rigid pipe section, a second rigid pipe section and a flexible pipe section extending between the first and second rigid pipe sections, wherein the flexible pipe section is configured to allow relative movement between the first rigid pipe section and the second rigid pipe section; and a fixture arrangement that couples the first rigid pipe section to the aircraft structure, the fixture arrangement comprising a spherical bearing surface which allows rotation of the first rigid pipe section relative to the aircraft structure.

Optionally the flexible pipe section is configured to allow relative translation between the first rigid pipe section and the second rigid pipe section in an axial direction, wherein the axial direction is parallel with a longitudinal axis of the first or second rigid pipe section.

Optionally the assembly is configured to allow relative rotation between the first rigid pipe section and the second rigid pipe section about a transverse axis, wherein the transverse axis is perpendicular to a longitudinal axis of the first rigid pipe section.

Optionally the fixture arrangement comprises a ball-and-socket joint.

Optionally the ball-and-socket joint comprises a ball in a socket, and the first rigid pipe section is coupled to the ball.

Optionally the aircraft assembly further comprises a first joint section fixedly attached to the first rigid pipe section and a second joint section fixedly attached to the second rigid pipe section, wherein the first joint section is configured to contact the second joint section and maintain said contact during relative movement between the first rigid pipe section and the second rigid pipe section.

Optionally the aircraft assembly further comprises a first clevis which couples the first rigid pipe section to the fixture arrangement and allows rotation of the first rigid pipe section relative to the fixture arrangement about a first gimbal axis; and a second clevis which couples the second rigid pipe section to the fixture arrangement and allows rotation of the second rigid pipe section relative to the fixture arrangement about a second gimbal axis, wherein the second gimbal axis is perpendicular to the first gimbal axis.

Optionally the fixture arrangement comprises a ball-and-socket joint; the ball-and-socket joint comprises a ball in a socket; the first clevis couples the first rigid pipe section to the ball; and the second clevis couples the second rigid pipe section to the ball.

Optionally the flexible pipe section comprises a bellows pipe.

A fifth aspect of the invention provides an aircraft wing comprising the aircraft assembly of the fourth aspect.

A sixth aspect of the invention provides an aircraft comprising the aircraft wing of the fifth aspect.

Features of any of the various aspects of the invention may be combined.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
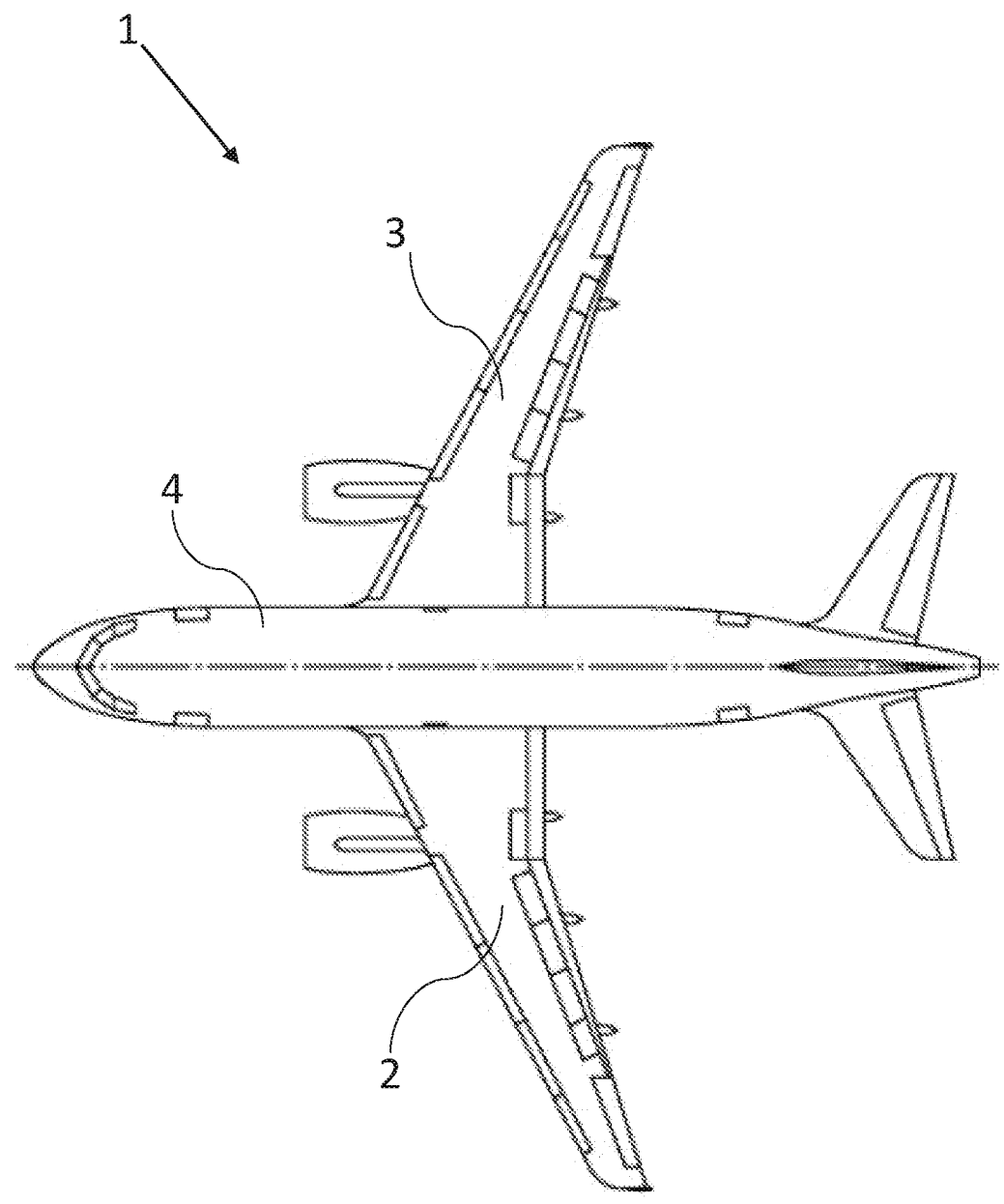
FIG. 1 shows an aircraft.

FIG. 1 shows an aircraft 1 with port and starboard wings 2, 3. Each wing has a cantilevered structure with a length extending in a generally spanwise direction 42 from a root to a tip (shown in FIG. 3), the root being joined to an aircraft fuselage 4. The wings 2, 3 are similar in construction so only the starboard wing 3 will be described in detail with reference to FIGS. 2 and 3.

Figure 2:
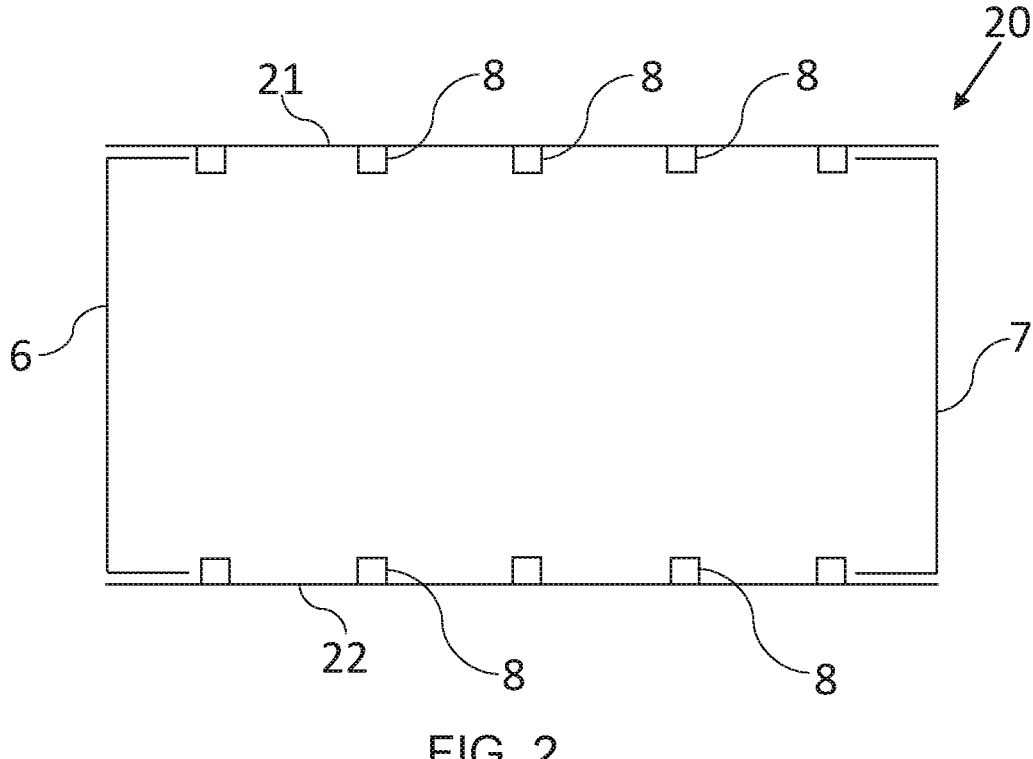
FIG. 2 is a sectional view of a wing box of the starboard wing.

The main structural element of the wing 3 is a wing box 20 that may be formed by upper and lower covers 21, 22 and front and rear spars 6, 7 shown in cross-section in FIG. 2. The covers 21, 22 and spars 6, 7 may each be formed of Carbon Fibre Reinforced Polymer (CFRP) laminate components. Each cover 21, 22 comprises a panel assembly and may have a curved aerodynamic outer surface (e.g. the upper surface of the upper cover 21 and the lower surface of the lower cover 22) over which air flows during flight of the aircraft 1. Each cover 21, 22 has an inner surface carrying a series of stiffeners 8 extending in the spanwise direction 42 (only some of the stiffeners 8 are labelled so as to improve the clarity of the figures). Each stiffener 8 is joined to one cover 21, 22 but not the other.

Figure 3:
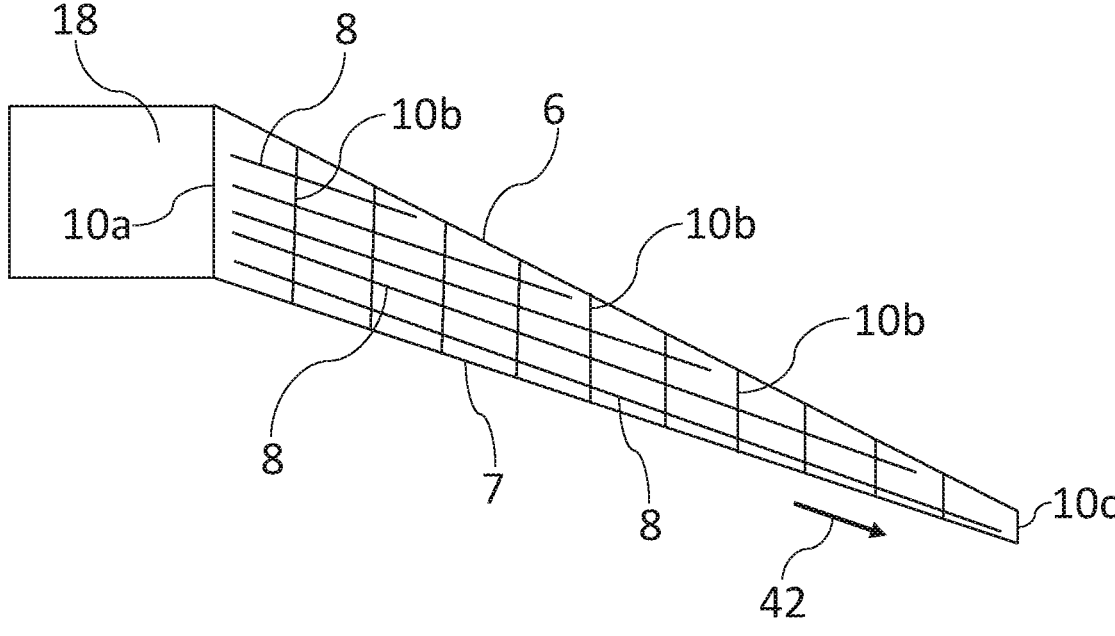
FIG. 3 shows the wing box extending along a wing.

It will be understood that any number of stiffeners 8 may be applied across the chord of the wing 3, although only five are shown coupled to each cover 21, 22 in FIGS. 2 and 3 for the purposes of clarity.

The wing box 20 may have a plurality of transverse ribs, each rib being joined to the covers 21, 22 and the spars 6, 7. The ribs 10 may include an inner-most inboard rib 10a located at the root of the wing box 20, an outer-most rib 10c at the tip of the wing box 20, and one or more mid-span ribs 10b between the inner-most and outer-most ribs 10a, 10c. The inner-most rib 10a may be an attachment rib which forms the root of the wing box 20 and is joined to a centre wing box 18 within the body of the fuselage 4. Each rib 10a, 10b, 10c may connect the upper cover 21 to the lower cover 22. The stiffeners 8 may pass through rib recesses (not shown) in the ribs 10b.

Figure 4:
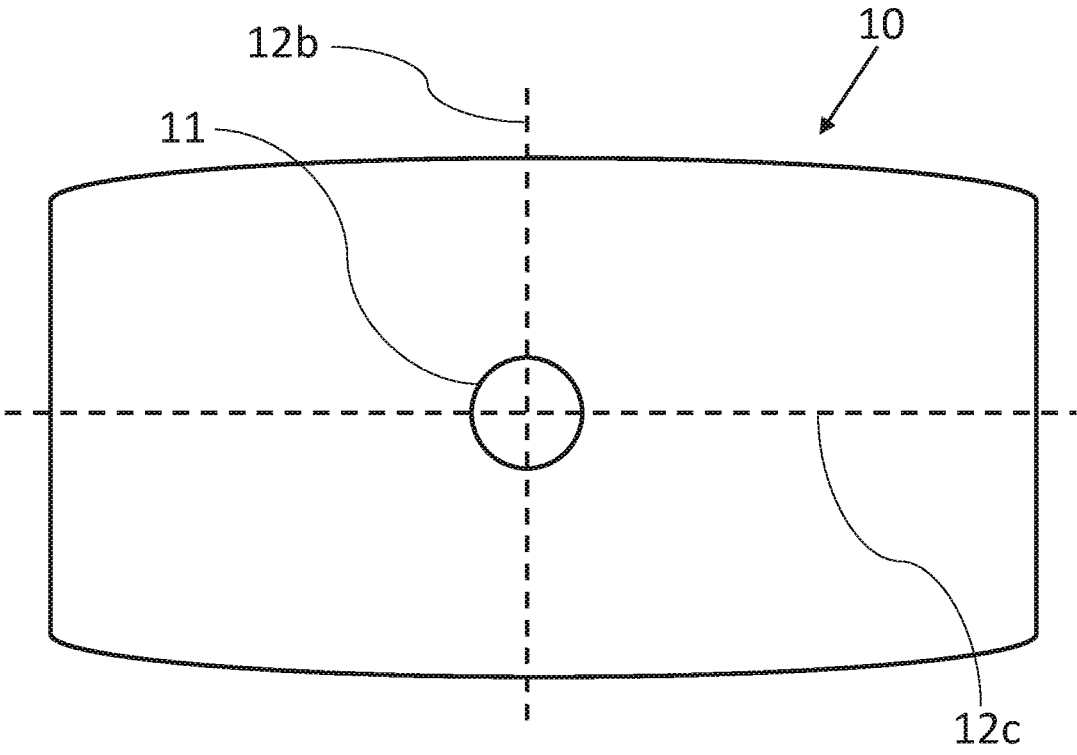
FIG. 4 shows a rib.

An aperture 11 is formed in one or more of the ribs 10, such as shown in FIG. 4. A pipe assembly 30a, 30b extends through the aperture 11 so that a longitudinal axis 12a of the pipe assembly 30a, 30b extends through the aperture 11. The pipe assembly 30a, 30b comprises a first rigid pipe section 31 and a second rigid pipe section 32 extending either side of a plane the rib 10. The example shown in FIGS. 5 and 6 comprises an outer pipe assembly 30a enveloping an inner pipe assembly 30b, although it will be appreciated there may be a single pipe assembly 30a, 30b (i.e. single walled) in alternative examples (such as the further example of FIGS. 15-19, described below).

The first and second rigid pipe sections 31, 32 may comprise or be formed of metal e.g. stainless steel. The first and second rigid pipe sections 31, 32 may have a constant thickness and diameter.

A flexible pipe section 33 extends between the first rigid pipe section 31 and second rigid pipe section 32 of each pipe assembly 30a, 30b, with each flexible pipe section 33 located at the plane of the rib 10 such that at least a portion of each flexible pipe section 33 extends either side of the plane of the rib 10. By ensuring the flexible pipe section 33 is located at the plane of the rib 10, any relative bending of the second pipe section 32 with respect to the first pipe section 31 occurs either side of the plane of the rib 10.

The flexible pipe section 33 may be a bellows pipe or other suitable arrangement for absorbing movements in the pipe assembly 30a, 30b.

The flexible pipe section 33 of the outer pipe assembly 30a may be integrally formed with the respective first and second rigid pipe sections 31, 32 of the outer pipe assembly 30a. The flexible pipe section 33 of the inner pipe assembly

30b may be integrally formed with the respective first and second rigid pipe sections 31, 32 of the inner pipe assembly 30b. In other words, the outer and inner pipe assemblies 30a, 30b may be continuous across the rib 10 and absent of any disassemblable couplings.

Figure 5:
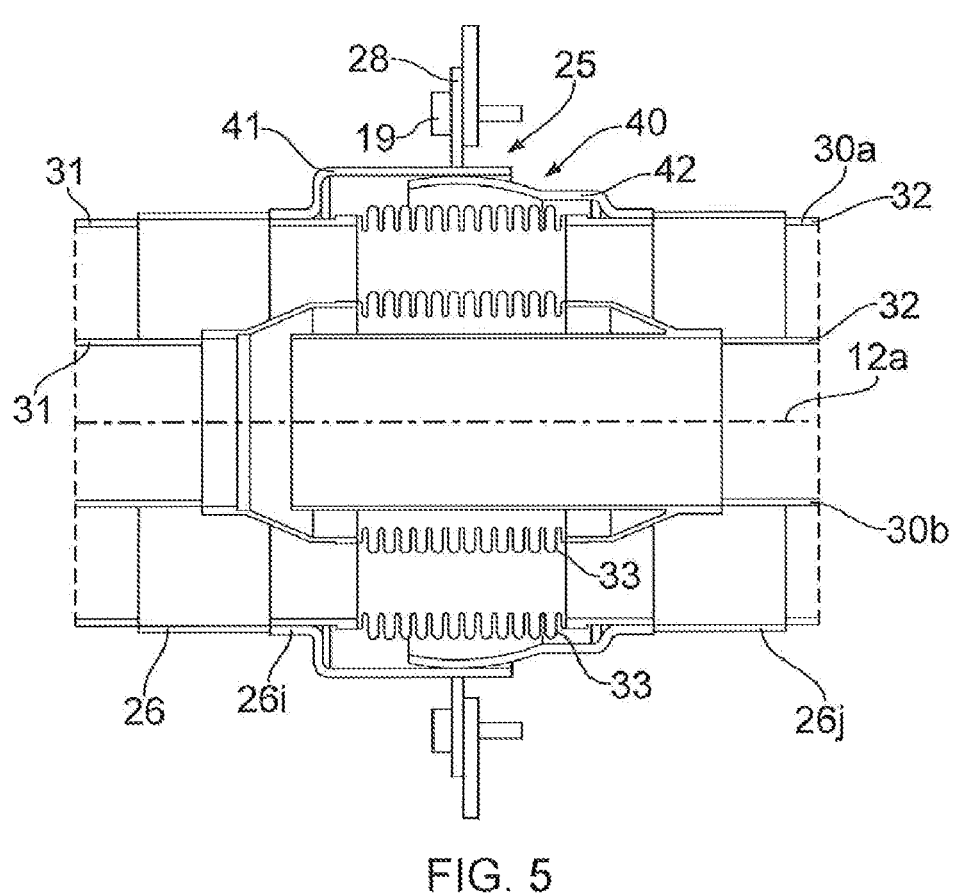
FIG. 5 shows a first example of an aircraft assembly.

The flexible pipe section 33 may be formed of metal, e.g. stainless steel. The flexible pipe section 33 may be welded to the respective first and second rigid pipe sections 31, 32. The flexible pipe section 33 may be a bellows arrangement comprising a series of undulations, such as shown in FIG. 5. The undulations may have a constant wall thickness. Alternatively, the flexible pipe 33 may be a braided pipe arrangement.

Each flexible pipe section 33 facilitates relative moment between the respective first and second rigid pipe sections 31, 32 to which they connect. The movement may be axial and/or rotational. In this manner, load transfer between the outer pipe assembly 30a and the rib 10 is reduced. For instance, if the outer pipe assembly 30a comprised a continuous rigid pipe section (not shown), the loads on the outer pipe assembly 30a caused by twisting and/or bending of the wing 3 could be transferred from the outer pipe assembly 30a to the rib 10, and thereby require additional strengthening of the rib 10. In addition, in double walled pipes having outer and inner pipe assemblies 30a, 30b, if the outer pipe assembly 30a comprises a flexible pipe section 33 and the inner pipe assembly 30b comprises a continuous rigid pipe section (not shown), the inner pipe assembly 30b would be resistant to bending and thereby clash with the outer pipe assembly 30a so as to transfer undesirable load to the rib 10.

In the present arrangement, the load transfer is reduced or mitigated by the flexible pipe section 33 providing for relative movement between the first and second rigid pipe sections 31, 32.

One of the pipe sections 31, 32, 33 of the outer pipe assembly 30a is fixed axially relative to the rib 10 by a fixture arrangement 25, so as to prevent unintended movement of the pipe assembly 30a along the wing box 20. In particular, the fixture arrangement 25 may comprise a sleeve 26 fixedly attached to an outer surface of the outer pipe assembly 30a. The sleeve 26 of the fixture arrangement 25 extends across at least a portion of the pipe assembly 30a, so as to overlap a portion of each of the first and second rigid pipe sections 31, 32. The fixture arrangement 25 may be located at a plane of the rib 10.

The fixture arrangement 25 may comprise a substantially electrically non-conductive material, e.g. the material may be a non-conductive polymer material. This helps to isolate the pipe assembly 30a, 30b from the rib 10 so that no metal-to-metal contact is formed. This helps to mitigate the effects of lightning strikes.

Figure 6:
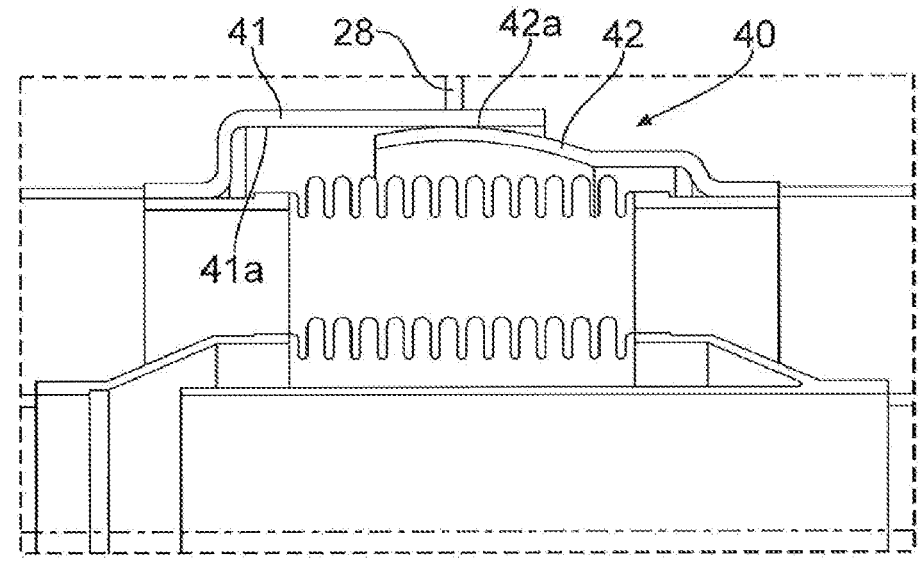
FIG. 6 shows a detailed view of a spacing arrangement of the first example.
Figure 7:
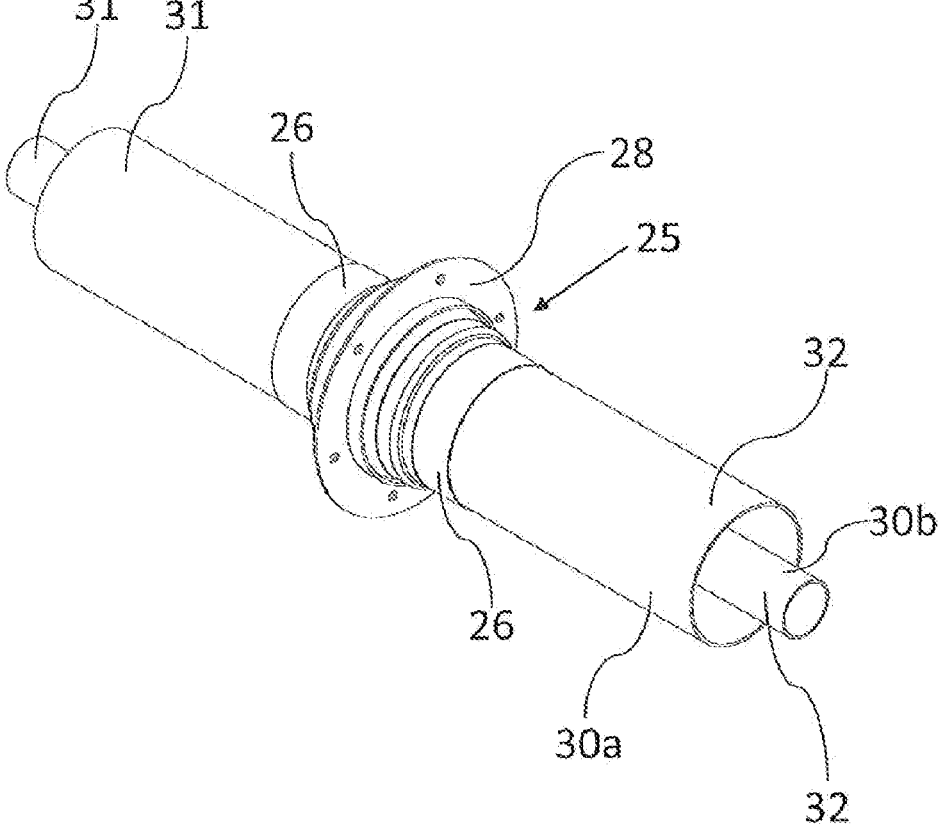
FIG. 7 shows a perspective view of the first example.

In the example shown in FIGS. 5 to 7, the first rigid pipe section 31 of the outer pipe assembly 30a is fixed relative to the rib 10 and the second rigid pipe section 32 and flexible pipe section 33 of the outer pipe assembly 30a are moveable relative to the rib 10. Alternatively, the second rigid pipe section 32 or flexible pipe section 33 of the outer pipe assembly 30a may be fixed relative to the rib 10.

To accommodate the relative movement between the rigid pipe sections 31, 32, the sleeve 26 may be formed of a first sleeve portion 26i and a second sleeve portion 26j.

To fix one of the pipe sections 31, 32, 33 of the outer pipe assembly 30a to the rib 10, the fixture arrangement 25 comprises a flange 28 that is fixed to the rib 10 with one or more fasteners 19. It will be appreciated that the rib 10 may be integrally formed with the fixture arrangement 25.

To ensure that the outer pipe assembly 30a maintains a substantially fixed distance from the rib 10, and thereby avoid impact against the rib 10 and in particular the aperture 11 of the rib 10, the fixture arrangement 25 may comprise a spacing arrangement 40. An example of such a spacing arrangement 40 is shown in FIGS. 5 and 6.

The spacing arrangement 40 may comprise a first joint section 41 fixedly attached to the first rigid pipe section 31 of the outer pipe assembly 30a and a second joint section 42 fixedly attached to the second rigid pipe section 32 of the outer pipe assembly 30a (e.g. via the sleeve portions 26i, 26j). The first joint section 41 and the second joint section 42 overlap at the plane of the rib 10. The first joint section 41 is configured to contact the second joint section 42 and maintain the contact between the first and second joint sections 41, 42 during relative movement between the first rigid pipe section 31 and the second rigid pipe section 32 (e.g. axial movement and/or rotational movement).

FIG. 6 shows a close-up view of the spacing arrangement 40, in which the first joint section 41 includes a straight profile 41a when viewed in cross-section as in FIG. 6, and the second joint section 42 includes a curved (spherical) profile 42a, when viewed in cross-section as in FIG. 6, which contacts the straight profile 41a of the first joint section 41. A bearing surface is defined between the first and second joint sections 41, 42 such that relative axial and/or rotational movement between the first and second rigid pipe sections 31, 32 is facilitated whilst maintaining a clearance distance between the second rigid pipe section 32 of the outer pipe assembly 30a and the fixture arrangement 25.

As the curved profile 42a of the second joint section 42 contacts a straight profile 41a of the first joint section 41, the second joint section 42 is able to facilitate rotation of the second rigid pipe section 32 relative to the first rigid pipe section 31 whilst preventing a clash between the second rigid pipe section 32 and the fixture arrangement 25.

Figure 8:
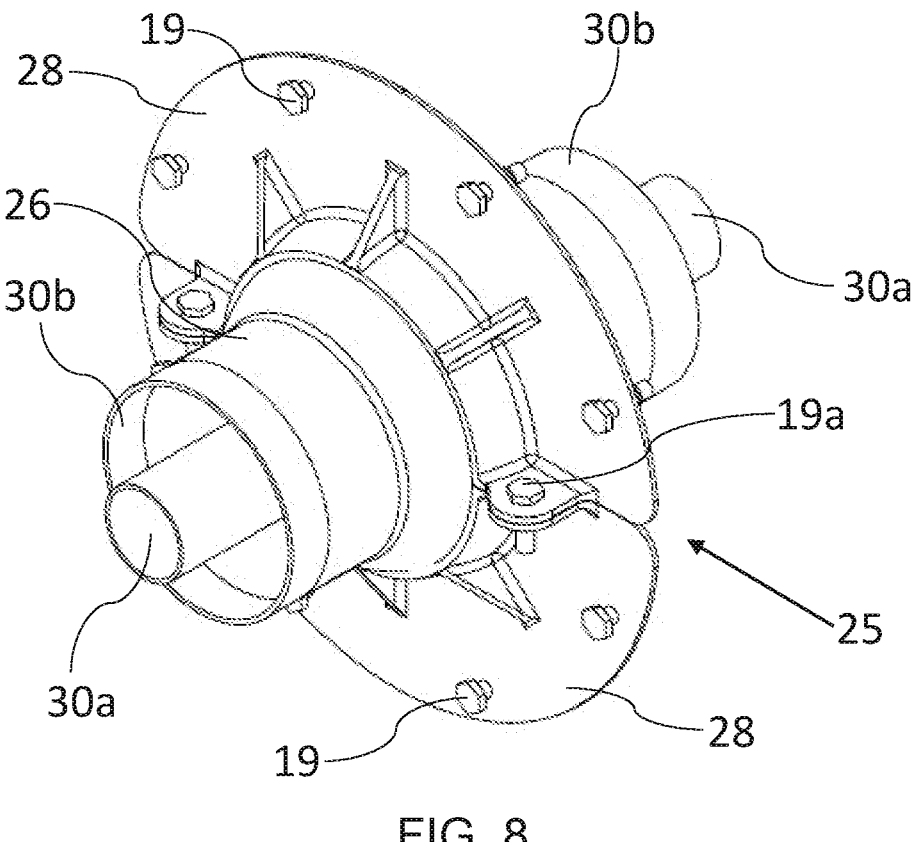
FIG. 8 shows a second example of an aircraft assembly.

In some examples, the fixture arrangement 25 may be arranged such that the outer pipe assembly 30a is rotatably coupled to the rib 10 by the fixture arrangement 25, such as shown in FIG. 8. In particular, the outer pipe assembly 30a is fixed axially substantially at the plane of the rib 10 but may rotate about at least one axis.

The sleeve 26 may comprise a protruding portion 26a, with the protruding portion 26a arranged to rotatably couple to a correspondingly recessed portion 27 of the fixture arrangement 25. Alternatively, the sleeve 26 may comprise a recessed portion 27 corresponding to a protruding portion 26a of the fixture arrangement 25. The protruding portion 26a and the recessed portion 27 have corresponding curved profiles.

Figures 9, 10:
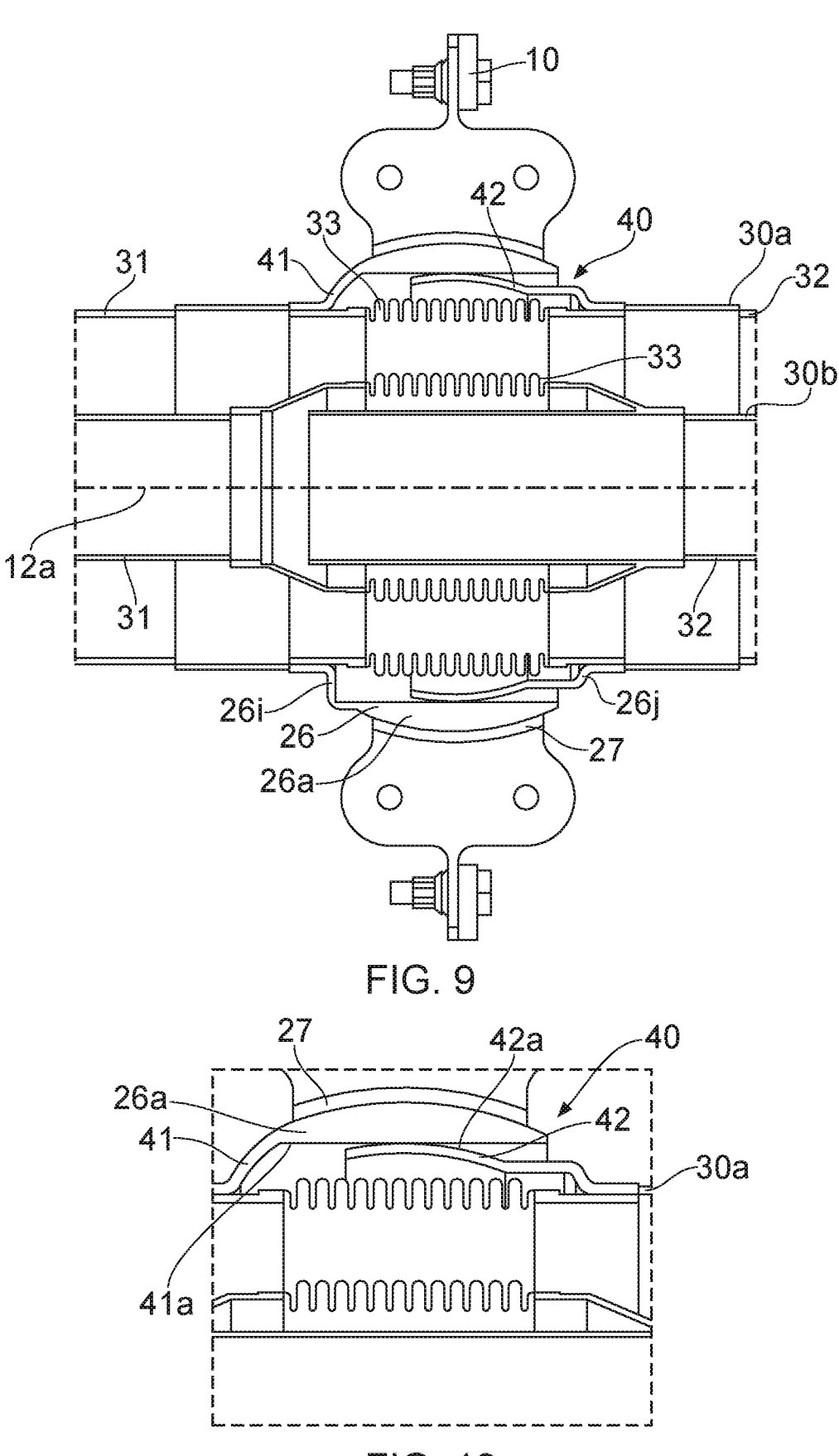
FIG. 9 shows a cross-section of the aircraft assembly of the second example.
FIG. 10 shows a detailed view of the aircraft assembly of the second example shown in FIG. 9.

In the case of FIGS. 8-10 the fixture arrangement comprises a ball-and-socket joint, the ball-and-socket joint comprising a ball (protruding portion 26a) and a socket fitting 27).

The socket fitting 27 comprises a concave spherical bearing surface which forms a socket. The ball 26a comprises a convex spherical bearing surface which is received in the socket, engaging the concave spherical bearing surface.

The fixture arrangement 25 restricts movement of the outer pipe assembly 30a in the longitudinal direction relative to the rib 10 and allows rotation of the outer pipe assembly 30a relative to the rib 10. In particular, the protruding portion 26a and the corresponding recessed portion 27 may have correspondingly spherically curved bearing surfaces forming a spherical bearing therebetween to allow rotation of the pipe assembly 30a relative to the rib 10. A spherical bearing between the protruding portion 26a and the recessed portion 27, for example as shown in FIG. 8, allows rotation of the pipe assemblies 30a, 30b relative to the rib 10 about three perpendicular axes 12a, 12b, 12c. The spherical bearing surfaces can slide relative to each other to allow this rotation of the pipe assembly. Rotation of the pipe assembly 30a via the above-mentioned bearing surface between the protruding portion 26a and the recessed portion 27 may supplement the clearance distance between the second rigid pipe section 32 of the outer pipe assembly 30a and the fixture arrangement 25 provided for by the spacing arrangement 40.

As well as enabling rotation of the pipe assembly, the spherical bearing surfaces also perform the function of restricting movement of the pipe assembly in the longitudinal direction relative to the rib 10, due to their spherical shape. Thus the protruding portion 26a acts as a stop member configured to engage with the fixture arrangement 25 to restrict movement of the pipe assembly 30a, 30b in the longitudinal direction relative to the wing structure. More specifically, the right-hand side of the protruding portion 26a acts as a first stop feature configured to engage with a first part of the fixture arrangement (the right-hand side of the recess 27) to restrict movement of the pipe assembly to the right, in the view of FIG. 6. Similarly the left-hand side of the protruding portion 26a acts as a second stop feature configured to engage with a second part of the fixture arrangement (the left-hand side of the recess 27) to restrict movement of the pipe assembly to the left.

Depending on the fit between the bearing surfaces, a certain amount of play may be permitted in the longitudinal direction. The fixture arrangement 25 may be configured to restrict movement of at least a portion of the pipe assembly in the longitudinal direction relative to the wing structure with play no greater than 10 mm, or with play no greater than 5 mm, or with play no greater than 2 mm, or with play no greater than 1 mm.

The rotation of the pipe assemblies 30a, 30b, relative to the rib 10, allows loads acting on the wing 3 to be accounted for. In particular, bending of the wing 3 may cause the outer pipe assembly 30a to clash with the edge of the aperture 11 if the distance of the outer pipe assembly 30a from the edge of the aperture 11 is not maintained by the fixture arrangement 25. If the pipe assembly were fixed to the rib 10, twisting and/or bending of the wing 3 could cause significant loads to be transferred from the pipe assembly 30a to the rib 10, and thereby require additional strengthening of the rib 10.

By permitting rotation of the pipe assembly 30a about the longitudinal axis 12a of the pipe assembly 30a and/or about one or more of the perpendicular axes 12b, 12c in a plane of the rib 10, the loads transferred from the pipe assembly 30a due to twisting and/or bending of the wing 3 are reduced or mitigated.

Meanwhile, by restricting movement of the pipe assembly 30a along its longitudinal axis 12a, the pipe assembly 30a is prevented from sliding freely through the wing box 20.

The outer and inner pipe assemblies 30a, 30b may be configured to convey a fuel, for example a petroleum based fuel such as kerosene, or a hydrogen fuel. Whilst it will be appreciated that the assembly may comprise a single pipe assembly 30a, 30b, it is particularly advantageous to provide a double-walled pipe arrangement with an outer pipe assembly 30a and an inner pipe assembly 30b when conveying cryogenic fuels, such as hydrogen.

In particular, the inner pipe assembly 30b may be configured to convey hydrogen fuel, with a space defined between the outer pipe assembly 30a and the inner pipe assembly 30b that provides a thermal barrier between the hydrogen fuel and the temperature in the wing box 20, thereby reducing heat transfer to maintain the low temperature of the hydrogen fuel.

The cryogenic temperatures required for the storage of hydrogen fuels, in contrast to the temperature of the surrounding wing box 20, may give rise to additional loads that act on the outer and inner pipe assemblies 30a, 30b that can be reduced or mitigated by the fixture arrangement 25. In particular, the cryogenic temperatures may cause the pipe assemblies 30a, 30b to contract. If the pipe assemblies 30a, 30b were fixed to the rib 10, these loads could be transferred to the rib 10, and thereby necessitate additional reinforcement of the rib 10.

The hydrogen fuel may be a gaseous hydrogen fuel or a liquid hydrogen fuel. In examples in which the hydrogen fuel is a gaseous hydrogen fuel, the space between the outer pipe assembly 30a and the inner pipe assembly 30b may comprise an inert gas such as nitrogen gas. The inert gas may have a high concentration (e.g. 98% or 99%) so as to prevent any reaction of the gaseous hydrogen with oxygen. In examples in which the hydrogen fuel is a liquid hydrogen fuel, the space between the outer pipe assembly 30a and the inner pipe assembly 30b may comprise a vacuum. The vacuum reduces heat transfer between the inner and outer pipe assemblies 30a, 30b.

The protruding portion 26a may be solid, or thermal insulation between the outer pipe assembly 30a and the rib 10 may be further enhanced by making the protruding portion 26a hollow.

In the example shown in FIG. 8, the flanges 28 each extend around a half-circumference of the aperture 11, so as to envelope the pipe assemblies 30a, 30b, and are joined by fasteners 19a. However, it will be appreciated that the flanges 28 may be of any suitable configuration. In the example shown in FIG. 7, a single flange 28 extends around the full circumference of the pipe assemblies 30a, 30b. In some examples, the flange(s) may extend around only a portion of the circumference of the pipe assemblies 30a, 30b.

As shown in FIG. 8, the flanges 28 may be located on a single side of the rib 10, with the recessed portion 27 of the fixture arrangement 25 integrally formed. In alternative examples, a flange may be attached on both sides of the rib 10, so that the recessed portion 27 is formed of two or more sections.

FIGS. 9 and 10 show an example in which the fixture arrangement 25 comprises a protruding portion 26a configured to engage a recessed portion 27, as well as a spacing arrangement 40. As will be appreciated, rotation of the pipe assembly 30a via the bearing surface between the protruding portion 26a and the recessed portion 27 may supplement movement provided by the flexible portions 33 of the pipe assemblies 30a, 30b, as well as the clearance distance achieved by the spacing arrangement 40.

Whilst the examples shown in FIGS. 5 to 10 provide for rotation of the pipe assemblies 30a, 30b about three perpendicular axes 12a, 12b, 12c, it will be appreciated that other examples may provide rotation about one or two perpendicular axes 12a, 12b, 12c.

Figure 11:
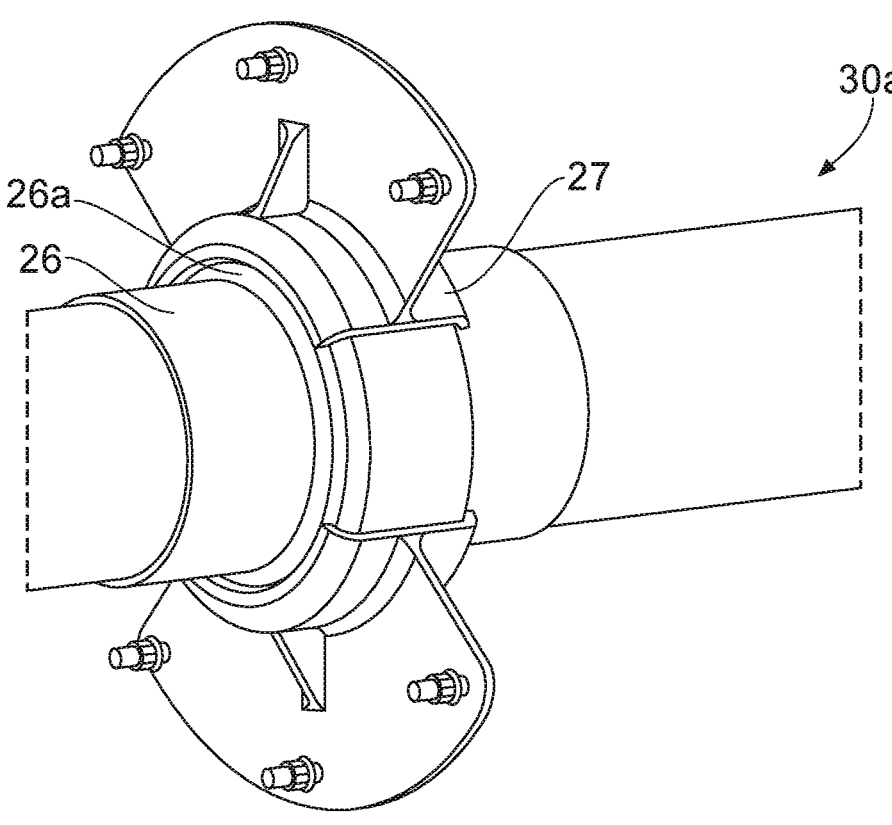
FIG. 11 shows a third example of an aircraft assembly.
Figure 12:
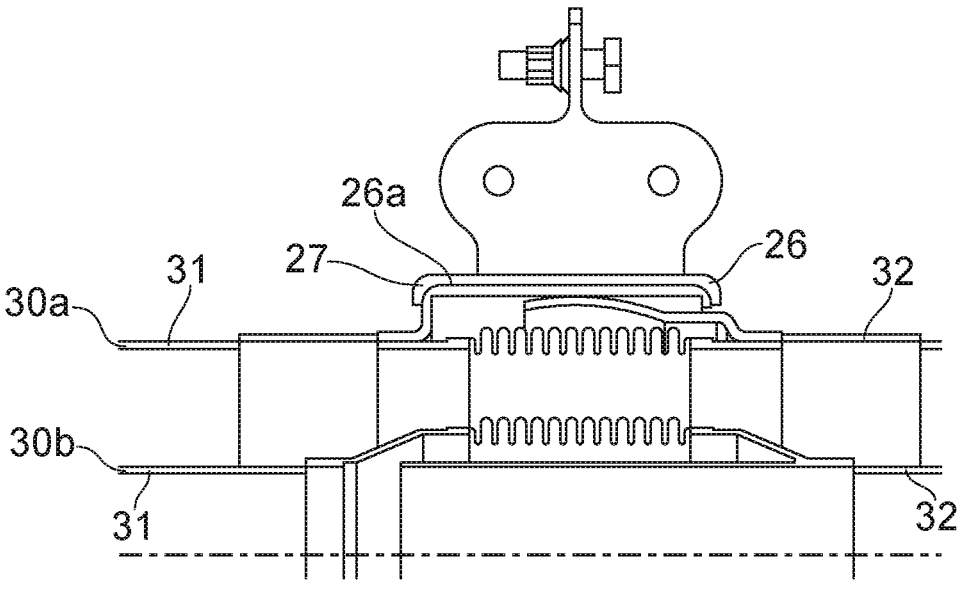
FIG. 12 shows a cross-section of the aircraft assembly of the third example.

FIGS. 11 and 12 show an example in which the sleeve 26 has a cylindrically shaped protruding portion 26a, with the recessed portion 27 having a corresponding profile such that the outer pipe assembly 30a may rotate about the longitudinal axis 12a of the pipe assembly 30a, but substantially prevents rotation about the transverse axes 12b, 12c parallel to the plane of the rib 10. This allows the loads due to twisting of the wing 3, which may otherwise transfer to the pipe assembly 30a, to be reduced or mitigated.

The bearing surfaces in FIGS. 11 and 12 each have a generally cylindrical shape which allows rotation of the pipe assembly relative to the rib about the longitudinal axis 12a extending in the longitudinal direction. The generally cylindrical shape of the bearing surfaces also restricts rotation of the pipe assembly relative to the rib about two perpendicular axes 12b, 12c, wherein the two perpendicular axes are perpendicular to each other and perpendicular to the longitudinal axis 12a.

As in the embodiments of FIGS. 9 and 10 (with a spherical bearing) the bearing surfaces in FIGS. 11 and 12 are also shaped to provide stop features which restrict movement of at least a portion of the pipe assembly in the longitudinal direction relative to the rib 10.

In this example, it will be appreciated that the flexible portion 33 still allows some relative movement between the first rigid pipe section 31 and the second rigid pipe section 32.

Figure 13:
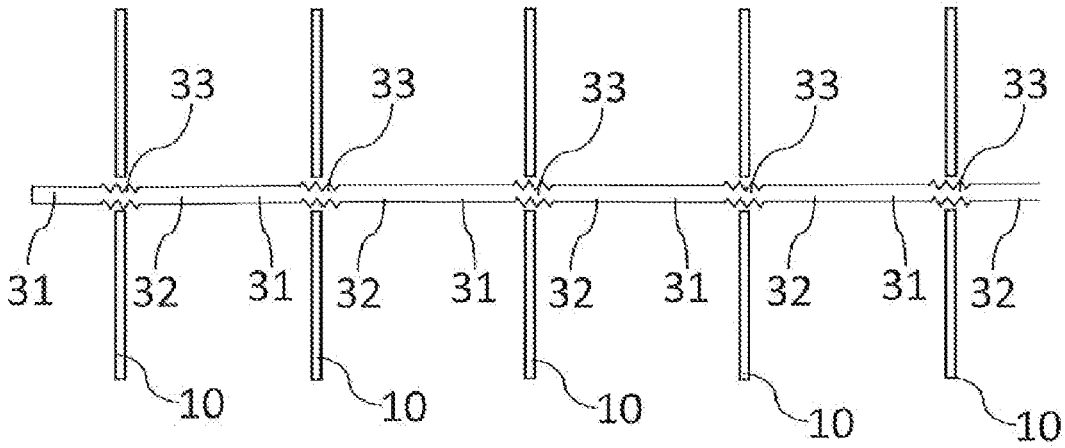
FIG. 13 shows a first example of a fuel pipe extending through a series of ribs of an aircraft wing.

The wing 3 may comprise a plurality of ribs 10a, 10b, 10c within the wing box 20, such as shown in FIG. 3. Each rib may comprise a corresponding flexible pipe section 33 located at a plane of the rib 10b, with first and second pipe sections 31, 32 extending either side of the plane of the rib 10b. FIG. 13 shows an example in which a flexible pipe section 33 is located at each rib 10 in the wing box 20. Similarly, a fixture arrangement 25 may be located at each rib 10.

Figure 14:
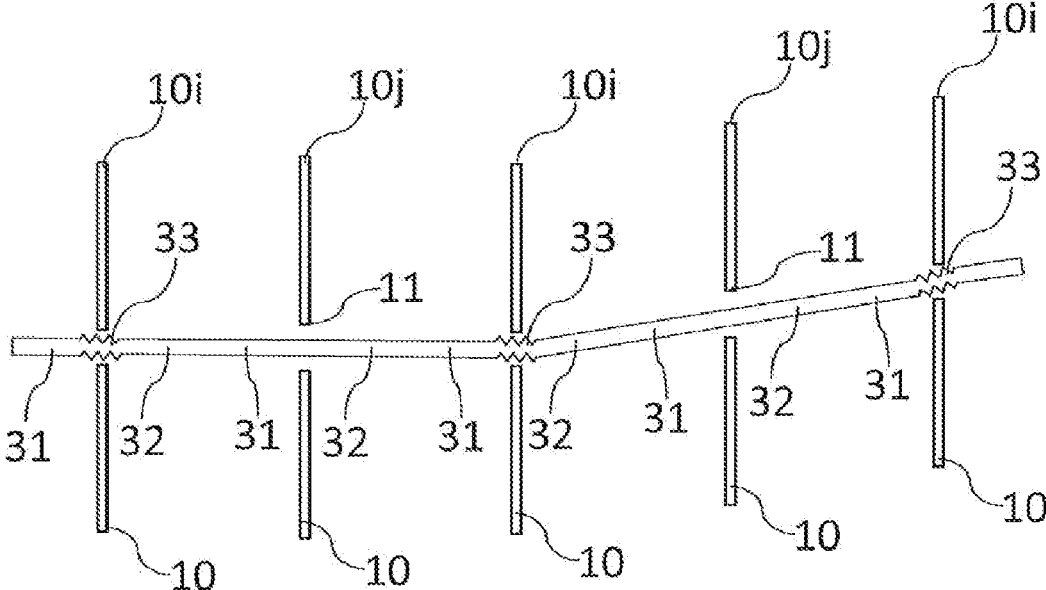
FIG. 14 shows a second example of a fuel pipe extending through a series of ribs of an aircraft wing.

In some examples, it may not be necessary to provide a flexible pipe section 33 at each rib 10. For example, the size of the aperture 11 and the expected loading on the pipe assemblies 30a, 30b may be such that a flexible pipe section 33 may be located at the plane of a first set of ribs 10i, whilst a second set of ribs 10j are absent a flexible pipe section 33 at the plane of each rib 10. At least some ribs 10 of the second set of ribs 10j may be located between ribs 10 of the first set of ribs 10i, such as shown in FIG. 14. Similarly, a fixture arrangement 25 may be located at the plane of the first set of ribs 10i and not the second set of ribs 10j.

Figures 15, 16:
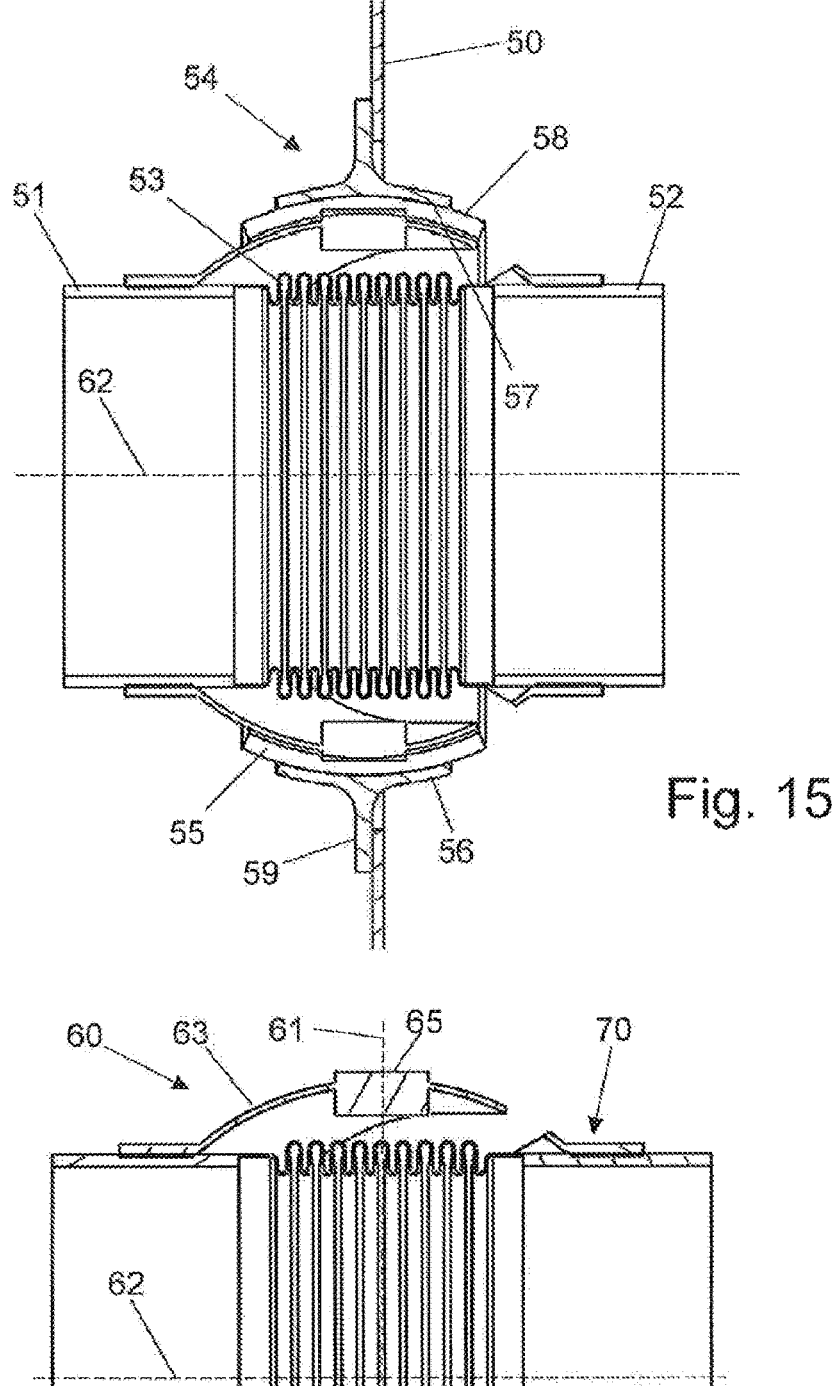
FIG. 15 shows a cross-section view of a further example of an aircraft assembly, viewed from a side.
FIG. 16 shows the assembly of FIG. 15 with certain parts removed, viewed from the same side as FIG. 15.

An aircraft assembly shown in FIG. 15 comprises: an aircraft structure 50; and a pipe assembly coupled to the aircraft structure 50. The aircraft structure 50 may be a wing rib, a fuselage frame, or any other aircraft structure.

The pipe assembly comprises a first rigid pipe section 51, a second rigid pipe section 52 and a flexible pipe section 53 (in this case a bellows) extending between the first and second rigid pipe sections. The flexible pipe section 53 is configured to allow relative movement between the first rigid pipe section 51 and the second rigid pipe section 52.

Unlike the previous examples, the pipe assembly of FIG. 15 is singled-walled rather than double-walled. In other embodiments, the pipe assembly of FIG. 15 may be replaced by a double-walled pipe arrangement as in the previous embodiments.

A fixture arrangement 54 couples the pipe assembly 51, 52, 53 to the aircraft structure 50. The fixture arrangement 54 comprises a ball-and-socket joint, the ball-and-socket joint comprising a ball 55 and a socket fitting 56. The socket fitting 56 comprises a flange 59 which is attached to the aircraft structure 50 by fasteners (not shown).

The socket fitting 56 comprises a concave spherical bearing surface 57 which forms a socket. The ball 55 comprises a convex spherical bearing surface 58 which is received in the socket, engaging the concave spherical bearing surface 57. The ball 55 forms a continuous ring around the pipe assembly, as shown in FIG. 17.

Figures 17, 18, 19:
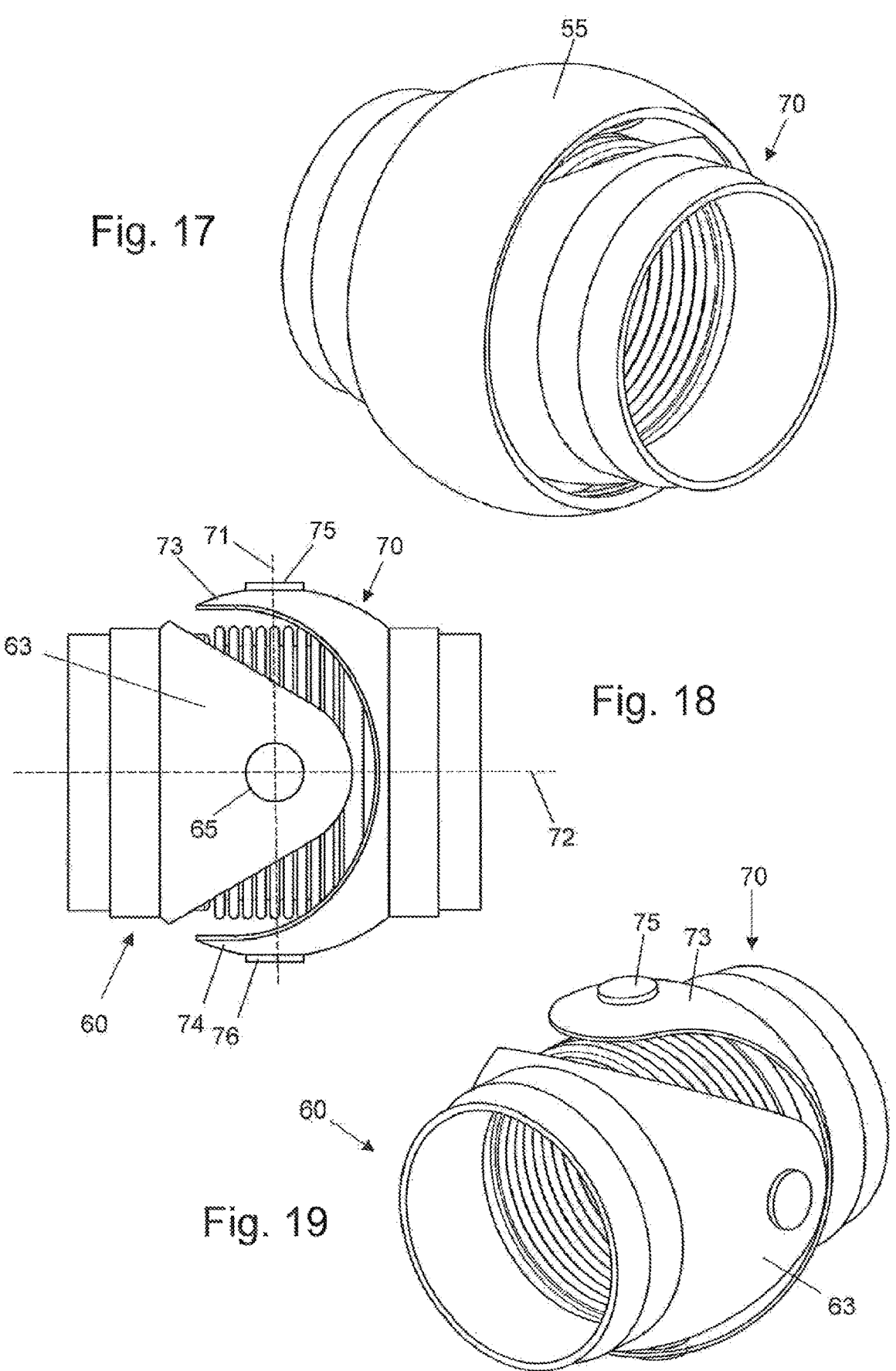
FIG. 17 is an isometric view of certain parts of the assembly of FIG. 15.
FIG. 18 shows the assembly of FIG. 15 with certain parts removed, viewed from above.
FIG. 19 is an isometric view of certain parts of the assembly of FIG. 15.

The rigid pipe sections 51, 52 are coupled to the ball 55 by a gimbal joint arrangement comprising a first clevis 60 shown most clearly from the side as in FIG. 16, and an identical second clevis 70 shown most clearly from above as in FIG. 18.

FIGS. 15 and 16 are cross-sectional side views showing the first clevis 60, which couples the first rigid pipe section 51 to the ball 55. The first clevis 60 comprises a pair of clevis arms 63, 64 with pins 65, 66 on a vertical first gimbal axis 61 which each form a respective rotary joint with the ball 55 as shown in FIG. 15. The rotary joints allow rotation of the first rigid pipe 51 section relative to the ball 55 about the vertical first gimbal axis 61. As shown in FIG. 16, the first gimbal axis 61 is perpendicular to a longitudinal axis 62 of the first rigid pipe section 51.

FIG. 18 is a view from above showing the second clevis 70, which couples the second rigid pipe section 52 to the ball 55. The second clevis 70 comprises a pair of clevis arms 73, 74 with pins 75, 76 on a horizontal second gimbal axis 71 which each form a respective rotary joint with the ball 55. These rotary joints are not visible in FIG. 15 since they lie out of the plane of the cross-section, but they are identical to the rotary joints with the first clevis 60 shown in FIG. 15. The rotary joints allow rotation of the second rigid pipe 52 section relative to the ball 55 about the second gimbal axis 71. The second gimbal axis 71 is perpendicular to a longitudinal axis 72 of the second rigid pipe section 52, and also perpendicular to the first gimbal axis 61.

The gimbal joint arrangement allows each rigid pipe section to rotate relative to the other pipe section about a respective gimbal axis 61, 71. The bellows pipe 53 is configured to allow this relative rotation between the first rigid pipe section 51 and the second rigid pipe section 52.

The embodiments of FIG. 9 and FIG. 15 will now be compared and contrasted. Both embodiments provide a certain degree of freedom of the rigid pipe sections relative to the aircraft structure, avoiding bending moments from the rigid pipe sections acting on the aircraft structure.

In the embodiment of FIG. 9, the sliding joint between the first joint section 41 and the second joint section 42, in combination with the bellows 33, allows axial translation of the second rigid pipe section 32 relative to the first rigid pipe section 31. In the embodiment of FIG. 15, the gimbal joint arrangement prevents such relative axial translation of the second rigid pipe section 52. This feature of the gimbal joint arrangement may be beneficial, in that it avoids collapse or over-extension of the bellows 53. The gimbal joint arrangement also has high durability when resisting axial inertia and vibration.

In both the embodiments of FIG. 9 and FIG. 15, the bellows pipe may be sufficiently rigid to substantially prevent either rigid pipe section rotating relative to the other rigid pipe section about its longitudinal axis (i.e. relative "twist" between the rigid pipe sections).

In both the embodiments of FIG. 9 and FIG. 15, the ball-and-socket joint allows rotation of both the first and second rigid pipe sections relative to the aircraft structure about three orthogonal axes. This may avoid twist loading (for instance arising from wing twist) acting on the pipework.

In the embodiment of FIG. 9, the spherical profile of the second joint section 42 allows the second rigid pipe section 32 to rotate relative to the first rigid pipe section 31 about a pair of transverse axes, orthogonal to the longitudinal axis of the second rigid pipe section 32. In the embodiment of FIG.

15, the gimbal joint arrangement restricts such relative rotation to the two gimbal axes. On the other hand, the gimbal joint arrangement of FIG. 15 enables rotation of both rigid pipe sections relative to the ball (in FIG. 9 the first rigid pipe section 31 is fixed to the ball).

In both the embodiments of FIG. 9 and FIG. 15, so-called "snaking" of the bellows is avoided, whilst also permitting a relative rotation between the rigid joint sections. Snaking occurs when one of the rigid pipe sections translates relative to the other rigid joint section, transverse to its longitudinal axis and without rotating. This results in a misalignment of the longitudinal axes of the rigid pipe sections and is ideally avoided.

In the embodiments of the invention described above, the pipe assembly extends through an aperture of an aircraft structure, such as a rib of a wing or a fuselage frame, and the flexible pipe section is located at a plane of the aircraft structure. In other embodiments of the invention, the pipe assembly may not extend through an aperture of the aircraft structure, and/or may not be located at a plane of the aircraft structure. For example the pipe assembly may extend along a length of a wing spar or wing stringer, and a fixture arrangement similar to any of the fixture arrangements described above may couple the pipe assembly to the wing spar or wing stringer.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft assembly comprising:
a rib of a wing;
an aperture in the rib;
a pipe assembly extending through the aperture, the pipe assembly comprising a first rigid pipe section, a second rigid pipe section and a flexible pipe section between the first and second rigid pipe sections;
wherein the flexible pipe section comprises a bellows pipe; and,
a fixture arrangement that couples one of the pipe sections to the rib, wherein the bellows pipe is located at a plane of the rib and configured to allow relative movement between the first rigid pipe section and the second rigid pipe section.

2. The aircraft assembly of claim 1, wherein the first rigid pipe section is configured to be fixed relative to the rib and the second rigid pipe section is configured to be moveable relative to the rib.

3. The aircraft assembly of claim 1, wherein the fixture arrangement comprises a first joint section fixedly attached to the first rigid pipe section and a second joint section fixedly attached to the second rigid pipe section, and wherein the first joint section is configured to contact the second joint section and maintain said contact during relative movement between the first rigid pipe section and the second rigid pipe section.

4. The aircraft assembly of claim 3, wherein the first joint section and the second joint section overlap at the plane of the rib.

5. The aircraft assembly of claim 1, wherein the first joint section comprises a planar profile and the second joint section comprises a curved profile, wherein the first and second joint sections contact at a bearing surface between the planar profile and the curved profile.

6. The aircraft assembly of claim 1, wherein the pipe assembly is an outer pipe assembly, and the aircraft assembly comprises an inner pipe assembly enveloping the outer pipe assembly.

7. The aircraft assembly of claim 1, wherein the pipe assembly is configured to convey hydrogen fuel.

8. The aircraft assembly of claim 1, wherein the fixture arrangement is configured to allow rotation of the pipe assembly, relative to the rib, about a longitudinal axis extending in the longitudinal direction.

9. The aircraft assembly of claim 1, wherein the fixture arrangement comprising a spherical bearing surface which allows rotation of the one of the pipe sections relative to the rib.

10. The aircraft assembly of claim 9, wherein the fixture arrangement comprises a ball-and-socket joint.

11. The aircraft assembly of claim 10, wherein the ball-and-socket joint comprises a ball in a socket, and the one of the pipe sections is coupled to the ball.

12. An aircraft wing comprising the aircraft assembly of claim 1.

13. An aircraft assembly comprising:

an aircraft structure;

a pipe assembly comprising a first rigid pipe section, a second rigid pipe section and a flexible pipe section extending between the first and second rigid pipe sections, wherein the flexible pipe section is configured to allow relative movement between the first rigid pipe section and the second rigid pipe section;

a fixture arrangement that couples the first rigid pipe section to the aircraft structure, the fixture arrangement comprising a spherical bearing surface which allows rotation of the first rigid pipe section relative to the aircraft structure;

wherein the fixture arrangement comprises a ball-and-socket joint; and, wherein the flexible pipe section is inside the ball-and-socket joint.

14. The aircraft assembly of claim 13, wherein the fixture arrangement comprises a ball-and-socket joint.

15. The aircraft assembly of claim 14, wherein the ball-and-socket joint comprises a ball in a socket, and the first rigid pipe section is coupled to the ball.

16. The aircraft assembly of claim 14, wherein the flexible pipe section is inside the ball-and-socket joint.

17. The aircraft assembly of claim 13, further comprising a first clevis which couples the first rigid pipe section to the fixture arrangement and allows rotation of the first rigid pipe section relative to the fixture arrangement about a first gimbal axis; and a second clevis which couples the second rigid pipe section to the fixture arrangement and allows rotation of the second rigid pipe section relative to the fixture arrangement about a second gimbal axis, wherein the second gimbal axis is perpendicular to the first gimbal axis.

18. The aircraft assembly of claim 13, wherein the flexible pipe section comprises a bellows pipe.

19. An aircraft wing comprising the aircraft assembly of claim 13.

* * * * *